US011412145B2

(12) United States Patent
DeBates et al.

(10) Patent No.: US 11,412,145 B2
(45) Date of Patent: Aug. 9, 2022

(54) ELECTRONIC DISPLAY AND CORRESPONDING METHOD FOR PRESENTING AN OVERLAY ON A DISPLAY

(71) Applicant: Motorola Mobility LLC, Chicago, IL (US)

(72) Inventors: Scott DeBates, Crystal Lake, IL (US); Douglas Lautner, Round Lake, IL (US); Jagat Shah, Lake in the Hills, IL (US)

(73) Assignee: Motorola Mobility LLC, Chicago, IL (US)

( * ) Notice: Subject to any disclaimer, the term of this patent is extended or adjusted under 35 U.S.C. 154(b) by 807 days.

(21) Appl. No.: 15/706,169

(22) Filed: Sep. 15, 2017

(65) Prior Publication Data

US 2019/0089903 A1 Mar. 21, 2019

(51) Int. Cl.
*H04N 5/232* (2006.01)
*G06K 7/10* (2006.01)
*H04N 5/265* (2006.01)
*G06Q 30/06* (2012.01)
*G06Q 30/02* (2012.01)

(52) U.S. Cl.
CPC ..... *H04N 5/23293* (2013.01); *G06K 7/10366* (2013.01); *G06Q 30/02* (2013.01); *G06Q 30/06* (2013.01); *H04N 5/265* (2013.01)

(58) Field of Classification Search
CPC ........... G06K 19/0723; G06Q 10/0833; G06Q 10/087
See application file for complete search history.

(56) References Cited

U.S. PATENT DOCUMENTS

| | | | |
|---|---|---|---|
| 9,721,394 B2* | 8/2017 | Rosenthal | H04N 5/232935 |
| 2007/0046560 A1* | 3/2007 | Neugebauer | G09F 3/204 345/1.1 |
| 2009/0079761 A1* | 3/2009 | Kokojima | H04N 13/111 345/619 |
| 2012/0184352 A1* | 7/2012 | Detlefsen | G07F 17/3225 463/25 |
| 2013/0218721 A1* | 8/2013 | Borhan | G06Q 20/306 705/26.41 |
| 2015/0153572 A1* | 6/2015 | Miao | G02B 27/017 359/630 |
| 2017/0092090 A1* | 3/2017 | Lerner | G06K 7/10128 |

* cited by examiner

*Primary Examiner* — Ming Wu
(74) *Attorney, Agent, or Firm* — Philip H. Burrus, IV

(57) ABSTRACT

An electronic device includes one or more processors, a tag reader, a display, and a wireless communication circuit. The one or more processors can identify an item in an environment of the electronic device. The tag reader can read item information from a tag corresponding to the item. The wireless communication circuit can retrieve one or more overlays across a network from the item information. The one or more processors can present an overlay selected from the one or more overlays on the display.

20 Claims, 8 Drawing Sheets

ELECTRONIC DISPLAY AND CORRESPONDING METHOD FOR PRESENTING AN OVERLAY ON A DISPLAY

BACKGROUND

Technical Field

This disclosure relates generally to electronic devices, and more particularly to electronic devices having displays.

Background Art

Portable electronic devices such as smartphones and tablet computers, which were once a luxury, are now ubiquitous. People use such portable electronic devices everyday. People use these devices to communicate with family, friends, and colleagues. In addition, the devices are used to manage calendars, contact lists, capture images and video, and surf the Internet. It would be advantageous to have an improved electronic device to offer a user a more seamless user interface experience to further broaden the applications for such devices.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Figure 1:
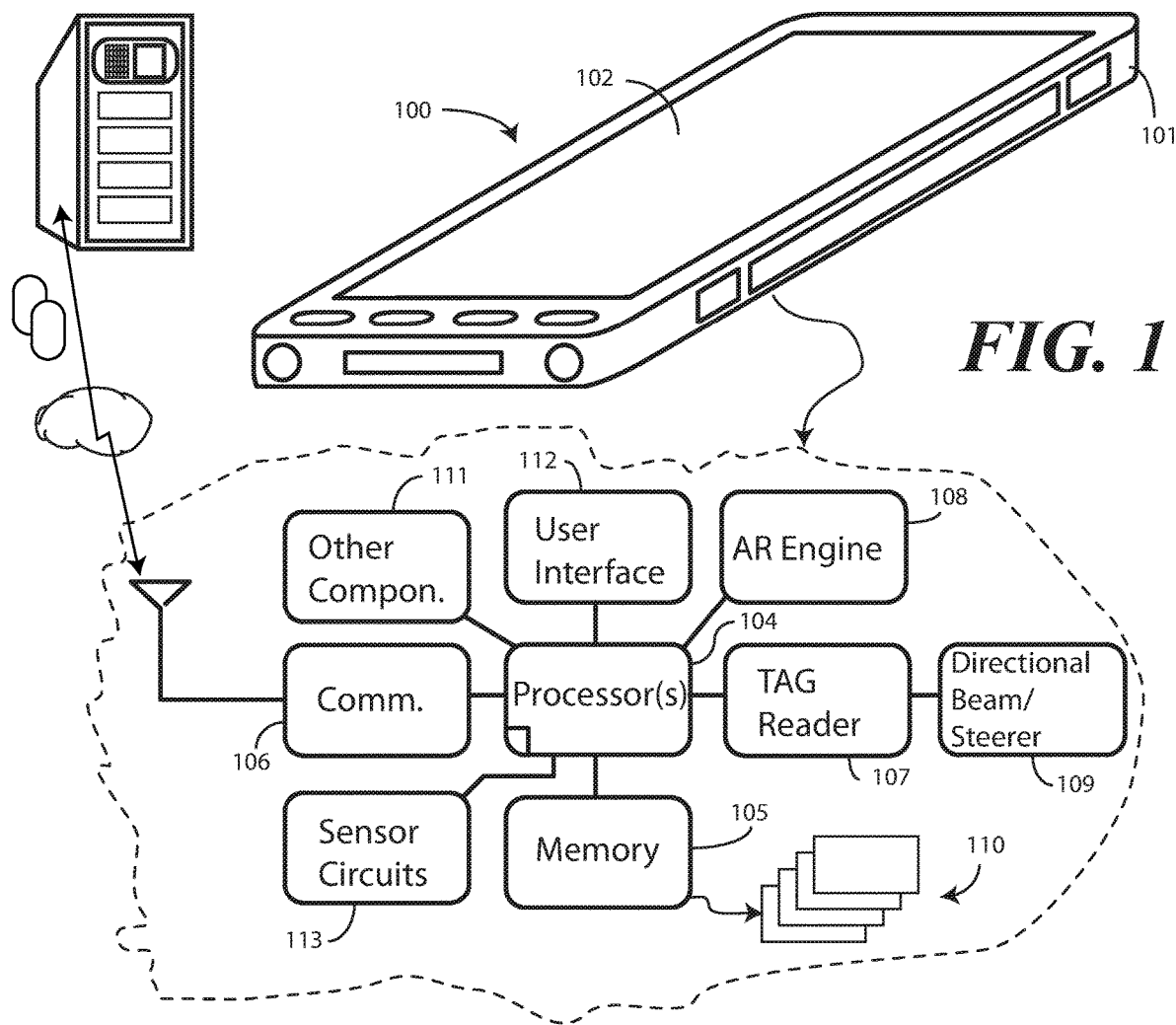
FIG. 1 illustrates one explanatory electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to the presentation of an overlay on a display of an electronic device in accordance with one or more embodiments of the disclosure. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of presenting overlays on a display in accordance with embodiments of the disclosure as described herein. The non-processor circuits may include, but are not limited to, a radio receiver, a radio transmitter, signal drivers, clock circuits, power source circuits, and user input devices. As such, these functions may be interpreted as steps of a method to perform the presentation of overlays on displays and/or images presented on the display in accordance with embodiments of the disclosure. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. As used herein, components may be "operatively coupled" when information can be sent between such components, even though there may be one or more intermediate or intervening components between, or along the connection path. The terms "substantially" and "about" are used to refer to dimensions, orientations, or alignments inclusive of manufacturing tolerances. Thus, a "substantially orthogonal" angle with a manufacturing tolerance of plus or minus two degrees would include all angles between 88 and 92, inclusive. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide an electronic device and corresponding method for presenting an overlay on a display of the electronic device. Embodiments of the disclosure contemplate that manufacturers of goods spend millions of dollars per year in marketing, with a large portion of these expenditures being directed to product labeling. Moreover, embodiments of the disclosure contemplate that, in many instances, product labeling constitutes a compromise of information intended to appeal to broad swaths of the population, and that customized product labeling is simply not possible on a large scale. Moreover, embodiments of the disclosure contemplate that all of the money spent on product labeling must be passed along to the end consumer in the form of extra costs. Embodiments of the disclosure contemplate that when a product is ultimately purchased, this expensive product labeling inevitably ends up being discarded as garbage or recycling.

Embodiments of the disclosure advantageously work to solve these issues by facilitating the presentation of an overlay atop an image of a product or good that serves as "virtual" product labeling. For example, in one or more embodiments a person captures a static or video image of a product using an imager. This static or video image is then placed on the display.

In one or more embodiments, the electronic device reads an identification tag associated with the product. For example, in one embodiment, the electronic device includes a Radio Frequency Identification (RFID) tag reader that reads an RFID tag attached to packaging of the product. In another embodiment, the electronic device includes a BLUETOOTH.sup.™ tag reader that reads a BLUETOOTH.sup.™ tag attached to the product.

Once the tag is read, in one or more embodiments the electronic device transmits information corresponding to the product, obtained from the tag, to a remote server, computer, or electronic device across a network. In response, the electronic device obtains one or more overlays from the remote server, computer, or electronic device. Upon selecting an overlay, in one or more embodiments, one or more processors of the electronic device present an overlay on a display of the electronic device.

In one or more embodiments, the overlay is superimposed upon the static or video images of the product. Illustrating by example, if a user is viewing video images, captured in real time by an imager, of a box of shoes on a shelf on the display of an electronic device, in one or more embodiments the one or more processors can superimpose the overlay atop the box so that it creates the appearance of a packaging label or printing on the box. In effect, the overlay becomes a "virtual" label or "virtual" product packaging for the product.

Embodiments of the disclosure offer numerous advantages over conventional product labeling or package printing. As an example, the use of the overlay allows formerly static printing to shift and become dynamic imagery viewed by the user. This allows the overlay—and its contents—to be customized and targeted to a specific person or a subset of the population. If, for example, the person viewing the overlay is a marathon runner, as identified by personal criteria stored in or accessible to the electronic device, the "virtual" shoebox label may include information describing the design and performance benefits of the shoe. In another example, if the person is known to always be a comparison shopper, as evidenced by a shopping history stored in or accessible to the electronic device, the "virtual" shoebox label may include information relating to price and how that price compares to other comparable shoes. In yet another example, if a person's native language is Spanish, as identified by one or more user preferences stored in the electronic device, the overlay can be presented with its text in Spanish. By contrast, if another user speaks Mandarin, the same overlay could be presented with the text in Mandarin. These are just a few examples of the myriad of ways in which the overlays can be customized. Others will be described below. Still others will be obvious to those of ordinary skill in the art having the benefit of this disclosure.

Embodiments of the disclosure also offer manufacturers of goods, and indeed sellers of services as well, the freedom to avoid static labeling on packages, signs, or other marketing materials, and instead simply tag them with a wirelessly readable tag identifying to what the package, sign, or marketing material corresponds. Product labeling information, pricing information, model numbers, brand names, logos, technical data, "best by" dates, and other information can then be updated in real time and included in the overlay rather than on the package, sign, or other object. Additionally, manufacturers can customize information for a specific store, city, region, or even customer to provide a more personalized product interaction experience. When viewing packages of food, for example, "foodies" concerned about the origin of that food can receive an overlay describing where each ingredient was sourced, while "dieters" can receive an overlay focusing on the nutritional content.

What's more, in one or more embodiments the electronic device can retrieve multiple overlays. A first overlay can be presented initially. However, when a user deliverers user input, such as touching the display, swiping the display, making or gesture, or delivering other input, the one or more processors of the electronic device can replace the overlay with another.

Illustrating by example, returning to the shoebox example, a first overlay may present identifying information such as brand, style, size, and other information. A second overlay may explain the materials, design, and construction of the shoes. A third overlay may explain warranty information. A fourth overlay may explain cleaning information, and so forth. The ability to retrieve multiple overlays means that far more information can be delivered to the end user than could be printed on the original packaging, thereby again increasing manufacturer flexibility and enhancing the user experience.

To use embodiments of the disclosure, in one or more embodiments a user launches an application operable to capture images of a product with an imager. Those images, which can be static or video, are presented on the display. The user points the imager toward a product of interest so that images of the same are presented on the display.

Once this occurs, a wireless tag reader of the electronic device scans and reads tag information from a tag attached to, or otherwise nearby, the product of interest. Product information can be extracted from the information retrieved from the tag. In one or more embodiments, a wireless communication device of the electronic device transmits this product information to a remote electronic device and retrieves one or more overlays corresponding to the product information.

The electronic device can then optionally, using one or more sensors, determine its location relative to the product of interest. This allows one or more processors of the electronic device to scale and/or resize the overlay. The one or more processors can then present the overlay on the display. In one or more embodiments, this presentation comprises superimposing the overlay atop the image of the product of interest so that the overlay becomes a visual representation of a product label. For example, the overlay can be superimposed over the images of the product as an augmented reality image so that it looks like printing on the package, sign, or other item itself. Said differently, when presenting the overlay, in one or more embodiments the electronic device operates in an augmented reality mode of operation to present the representation of product labeling or printing on an image of a product or other object as an augmented reality experience.

Turning now to FIG. 1, illustrated therein is one explanatory electronic device 100 configured in accordance with one or more embodiments of the disclosure. The electronic device 100 of FIG. 1 is shown as a portable electronic device. The explanatory electronic device 100 of FIG. 1 includes a housing 101. The housing 101 can include one or more housing portions, such as a first housing portion and a second housing portion. In this illustrative embodiment, the first housing portion is disposed about the periphery of a display 102.

A block diagram schematic of the electronic device 100 is also shown in FIG. 1. In one embodiment, the electronic device 100 includes one or more processors 104. The one or more processors 104 are operable with the display 102 and other components of the electronic device 100. The one or more processors 104 can include a microprocessor, a group of processing components, one or more ASICs, programmable logic, or other type of processing device. The one or more processors 104 can be operable with the various components of the electronic device 100. The one or more processors 104 can be configured to process and execute executable software code to perform the various functions of the electronic device 100.

A storage device, such as memory 105, can optionally store the executable software code used by the one or more processors 104 during operation. The memory 105 may include either or both static and dynamic memory components, may be used for storing both embedded code and user data. The software code can embody program instructions and methods to operate the various functions of the electronic device 100, and also to execute software or firmware applications and modules. The one or more processors 104 can execute this software or firmware, and/or interact with modules, to provide device functionality.

The one or more processors 104 can be responsible for performing the primary functions of the electronic device 100. For example, in one embodiment the one or more processors 104 comprise one or more circuits operable with one or more user interface devices, which can include the display 102, to present presentation information to a user. The executable software code used by the one or more processors 104 can be configured as one or more modules 110 that are operable with the one or more processors 104. Such modules 110 can store instructions, control algorithms, and so forth. While these modules 110 are shown as software stored in the memory 105, they can be hardware components or firmware components integrated into the one or more processors 104 as well.

In this illustrative embodiment, the electronic device 100 also includes an optional wireless communication device 106 that can be configured for wired or wireless communication with one or more other devices or networks. The networks can include a wide area network, a local area network, and/or personal area network. Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, GPRS networks, iDEN networks, and other networks.

The wireless communication device 106 may also utilize wireless technology for communication, such as, but are not limited to, peer-to-peer or ad hoc communications such as HomeRF, Bluetooth and IEEE 802.11 (a, b, g or n); and other forms of wireless communication such as infrared technology. The wireless communication device 106 can include wireless communication circuitry, one of a receiver, a transmitter, or transceiver, and one or more antennas.

In one or more embodiments, the electronic device 100 also includes a tag reader 107. The tag reader 107 can take different forms, and can use different technologies. Illustrating by example, in one embodiment the tag reader 107 comprises components and features of a RFID reader (also referred to as a RFID interrogator) that is implemented for two-way wireless communication with RFID tags. In another embodiment, the tag reader 107 comprises components and features of a BLUETOOTH.sup.™ reader that is implemented for two-way wireless communication with BLUETOOTH.sup.™ tags. While RFID and BLUETOOTH.sup™ are two examples of tag readers 107 configured in accordance with one or more embodiments of the disclosure, other technologies with which electronically readable tags can be interrogated by the electronic device 100 will be obvious to those of ordinary skill in the art having the benefit of this disclosure.

Using an RFID reader as an illustrative tag reader 107 for ease of discussion, in one or more embodiments the tag reader 107 is configured to read RFID tags, which are activated in the presence of the tag reader 107 when interrogated for data stored in the RFID tag. Generally speaking, RFID "tags" are small electronic tags or labels that can be programmed with identifying data or other information. In one or more embodiments, the tag reader 107 can transmit an interrogation signal as a broadcast message requesting RFID tags that are in range to cause the return of identifying data or other information stored within the RFID tags. This information is communicated back to the tag reader 107 wirelessly via a radio frequency (RF) communication channel.

In implementations, an RFID tag can include an application specific integrated circuit or central processing module, as well as a transmitter and a receiver (or alternatively a transceiver) for two-way communication with the tag reader 107. In response to receipt of an interrogation signal, the application specific integrated circuit or central processing module of the RFID tag formulates a response that may include data stored at the RFID tag. This response is wirelessly transmitted to the tag reader 107.

The response signals from a RFID tag can be communicated using low frequency (LF), high frequency (HF), or ultra-high frequency (UHF) radio waves. The RFID tag data can be stored in non-volatile memory, and the application specific integrated circuit or central processing module can be implemented as fixed or programmable logic for processing the RFID tag data, as well as modulating and demodulating the RF signals. The tag reader 107 of the electronic device 100 receives the response signals from the RFID tag, and the response signals can include the data from the RFID tag. The response signal and data received by the tag reader 107 can include information that an RFID tag is storing, has obtained, is producing, and so forth. Further, the response signal and data received from an RFID tag can include identification information, such as product information, product identifiers, item information, codes or an alphanumeric values, a parameter derived from a sensor including a sensor value, a parameter value, a descriptive indication, or some combination thereof. Other data suitable for inclusion in the response signals from the RFID tag will be obvious to those of ordinary skill in the art having the benefit of this disclosure.

In one or more embodiments, the tag reader 107 can interrogate one or more RFID tags, which effectively requests the RFID tags to provide item information, data, or other information information wirelessly. The RFID tag information (shown in FIG. 4 below) includes information that describes and/or is associated with the RFID tag, an object associated with or attached to the RFID tag, a physical location of the RFID tag, and so forth. In one or more embodiments this information comprises item information identifying an item or product. The item information can optionally be read from the RFID tag and can be utilized by the one or more processors 104 to retrieve one or more overlays as will be described in more detail below.

In one or more embodiments, the tag reader 107 interrogates RFID tags with a directional beam. Illustrating by example, an optional beam steerer 109 can be used with the tag reader 107 to cause interrogation signals to be spatially steered in a particular direction or toward a particular object. The beam steerer 109 can include a spatial modulator and/or one or more RF direction components to direct signals from the tag reader 107 in a particular direction.

In one or more embodiments, the beam steerer 109 serves to steer RF signals from the tag reader 107 toward a particular object. The one or more processors 104 are also operable with the beam steerer 109 and can control steering of the RF signals from the tag reader 107 in one or more embodiments.

Other components 111 can be included with the electronic device 100. The other components 111 can be operable with the one or more processors 104 and can include input and output components associated with a user interface 112, such as power inputs and outputs, audio inputs and outputs, and/or mechanical inputs and outputs. The other components 111 can include output components such as video, audio, and/or mechanical outputs. For example, the output components may include a video output component or auxiliary devices including a cathode ray tube, liquid crystal display, plasma display, incandescent light, fluorescent light, front or rear projection display, and light emitting diode indicator. Other examples of output components include audio output components such as a loudspeaker disposed behind a speaker port or other alarms and/or buzzers and/or a mechanical output component such as vibrating or motion-based mechanisms. Still other components will be obvious to those of ordinary skill in the art having the benefit of this disclosure.

One or more sensor circuits 113 are operable with the one or more processors 104 in one or more embodiments. These sensor circuits 113 can be used to detect, for example, to detect distances of the electronic device 100 from a particular object. Generally speaking, the one or more sensor circuits 113 can include sensors configured to sense or determine physical parameters indicative of conditions in an environment about the electronic device 100.

Illustrating by example, the physical sensors can include devices for determining information such as motion, bearing, location, travel mode, acceleration, orientation, proximity to people, places, and other objects, lighting, capturing images, and so forth. The one or more sensor circuits 113 can include various combinations of microphones, location detectors, motion sensors, physical parameter sensors, temperature sensors, barometers, proximity sensor components, proximity detector components, wellness sensors, touch sensors, cameras, audio capture devices, and so forth. Many examples of sensor circuits 113 are described below with reference to FIG. 2. Others will be obvious to those of ordinary skill in the art having the benefit of this disclosure.

In one or more embodiments, the electronic device 100 includes an augmented reality engine 108. In one or more embodiments the augmented reality engine 108 can augment image data captured by an imager of the electronic device 100, such as static or video images, by presenting representations of objects on the image data to create augmented image data. The augmented reality engine 108 augments the image data by presenting one or more visual representations along the image to create augmented image data, which can be presented on the display 103. In one or more embodiments, the augmented reality engine 108 superimposes visual representations along captured image(s) to present augmented image data on the display 103.

In one or more embodiments, the augmented reality engine 108 can present an overlay as a visible object on images captured by the imager of the electronic device 100. The visible object, in one or more embodiments, comprises product labeling, printing, or other information associated with a particular product. However, the visual object can take a variety of forms, such as that of a photograph, picture or other graphic. The visible object can be configured as an overlay. Alternatively, the visual object can comprise colored shapes, patterned objects, pictures, computer graphic images, and so forth. Other visible objects will be readily obvious to those of ordinary skill in the art having the benefit of this disclosure.

The augmented reality engine 108 augments images captured by the imager of the electronic device 100—or the image data corresponding thereto—for presentation on the display 103. In one or more embodiments, this occurs by superimposing the visual object on the captured images. The resulting augmented image data can then be presented on the display 103. To the user, this is visually perceived as if the visual object has suddenly "appeared" sitting atop the captured image.

It is to be understood that FIG. 1 is provided for illustrative purposes only and for illustrating components of one electronic device 100 in accordance with embodiments of the disclosure, and is not intended to be a complete schematic diagram of the various components required for an electronic device. Therefore, other electronic devices in accordance with embodiments of the disclosure may include various other components not shown in FIG. 1, or may include a combination of two or more components or a division of a particular component into two or more separate components, and still be within the scope of the present disclosure.

Figure 2:
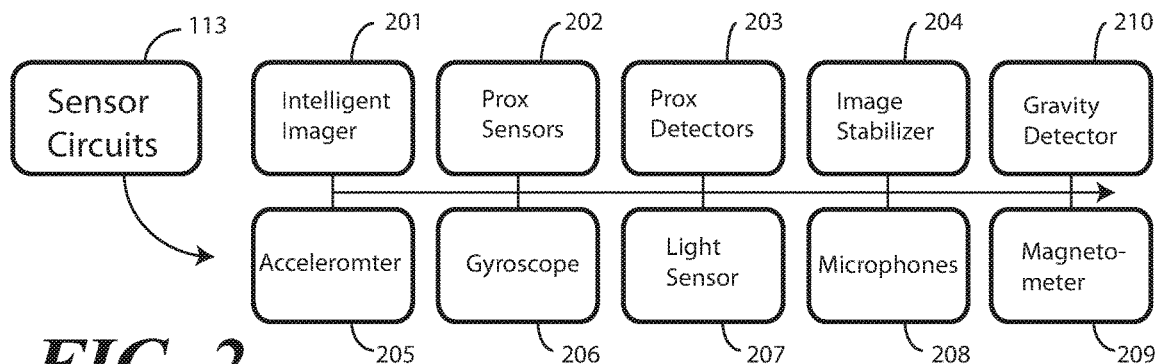
FIG. 2 illustrates one or more sensors operable, alone or in combination, with an electronic device in accordance with one or more embodiments of the disclosure.

Turning now to FIG. 2, illustrated therein are examples of various sensor circuits 113 that can be operable—alone or in combination—with the one or more processors (104) of the electronic device (100) in accordance with one or more embodiments of the disclosure. It should be noted that the sensor circuits 113 shown in FIG. 2 are not comprehensive, as others will be obvious to those of ordinary skill in the art having the benefit of this disclosure. Additionally, it should be noted that the various sensor circuits 113 shown in FIG. 2 could be used alone or in combination. Accordingly, many electronic devices will employ only subsets of the sensor circuits 113 shown in FIG. 2, with the particular subset defined by device application.

An intelligent imager 201 can be configured to capture an image of environments about an electronic device. The intelligent imager 201 can optionally determine whether the object matches predetermined criteria. For example, the intelligent imager 201 operate as an identification module configured with optical recognition such as include image recognition, character recognition, visual recognition, facial recognition, color recognition, shape recognition and the like. Advantageously, the intelligent imager 201 can, in one or more embodiments, identify a product, sign, or other object from an image taken of the general environment of the electronic device (100).

In addition to capturing photographs, the intelligent imager 201 can function in other ways as well. For example, in some embodiments the intelligent imager 201 can capture multiple successive pictures to capture more information that can be used to determine bearing and/or location. By referencing video or successive photographs with reference data, the intelligent imager 201 can determine, for example, whether the electronic device (100) is moving toward a product or away from a product. Alternatively, the intelligent imager 201 can compare the size of certain objects within captured images to other known objects to determine the size of the former. In still other embodiments, the intelligent imager 201 can capture images or video frames, with accompanying metadata such as motion vectors.

In one embodiment, the sensor circuits 113 can include one or more proximity sensors. The proximity sensors can include one or more proximity sensor components 202. The proximity sensor components 202 can also include one or more proximity detector components 203. In one embodiment, the proximity sensor components 202 comprise only signal receivers. By contrast, the proximity detector components 203 include a signal receiver and a corresponding signal transmitter.

While each proximity detector component 203 can be any one of various types of proximity sensors, such as but not limited to, capacitive, magnetic, inductive, optical/photoelectric, imager, laser, acoustic/sonic, radar-based, Doppler-based, thermal, and radiation-based proximity sensors, in one or more embodiments the proximity detector components 203 comprise infrared transmitters and receivers. The infrared transmitters are configured, in one embodiment, to transmit infrared signals having wavelengths of about 860 nanometers, which is one to two orders of magnitude shorter than the wavelengths received by the proximity sensor components 202. The proximity detector components 203 can have signal receivers that receive similar wavelengths, i.e., about 860 nanometers.

The other sensor circuits 113 can include an image stabilizer 204. The image stabilizer 204 can be operable with motion detectors, such as the accelerometer 205 and/or gyroscope to compensate for pan, rotation, and tilt of the electronic device (100) when the intelligent imager 201 is capturing images. The image stabilizer 204 can comprise an optical image stabilizer, or alternatively can be an electronic image stabilizer.

The sensor circuits 113 can also include motion detectors, such as one or more accelerometers 205, and/or gyroscopes 206. For example, an accelerometer 205 may be used to show vertical orientation, constant tilt and/or whether the electronic device (100) is stationary. The measurement of tilt relative to gravity is referred to as "static acceleration," while the measurement of motion and/or vibration is referred to as "dynamic acceleration." A gyroscope 206 can be used in a similar fashion.

An optional gravity sensor 210 can also be used to determine the spatial orientation of the electronic device (100) by detecting a gravitational direction. This information can be used to determine in which direction the RF signals from the tag reader (107) are directed, or in which direction the intelligent imager 201 is oriented. In addition to, or instead of, the gravity sensor 210, an electronic compass can be included to detect the spatial orientation of the electronic device (100) relative to the earth's magnetic field.

A light sensor 207 can detect changes in optical intensity, color, light, or shadow in the environment of an electronic device (100). This can be used to make inferences about whether the electronic device (100) is indoors or outdoors. An infrared sensor can be used in conjunction with, or in place of, the light sensor 207. The infrared sensor can be configured to detect thermal emissions from an environment about an electronic device, such as when sunlight is incident upon the electronic device.

A magnetometer 209 can be included as well. The magnetometer 209 can be configured to detect the presence of external magnetic fields. The sensor circuits 113 can also include an audio capture device 208, such as one or more microphones to receive acoustic input. The one or more microphones can be used to sense voice input, voice commands, and other audio input. The one or more microphones include a single microphone. In other embodiments, the one or more microphones can include two or more microphones. Where multiple microphones are included, they can be used for selective beam steering to, for instance, determine from which direction a sound emanated.

It should be noted that the illustrative sensor circuits 113 of FIG. 2 are not comprehensive. Numerous others could be added. Accordingly, the sensor circuits 113 of FIG. 2 are illustrative only, as numerous others will be obvious to those of ordinary skill in the art having the benefit of this disclosure.

Figure 3:
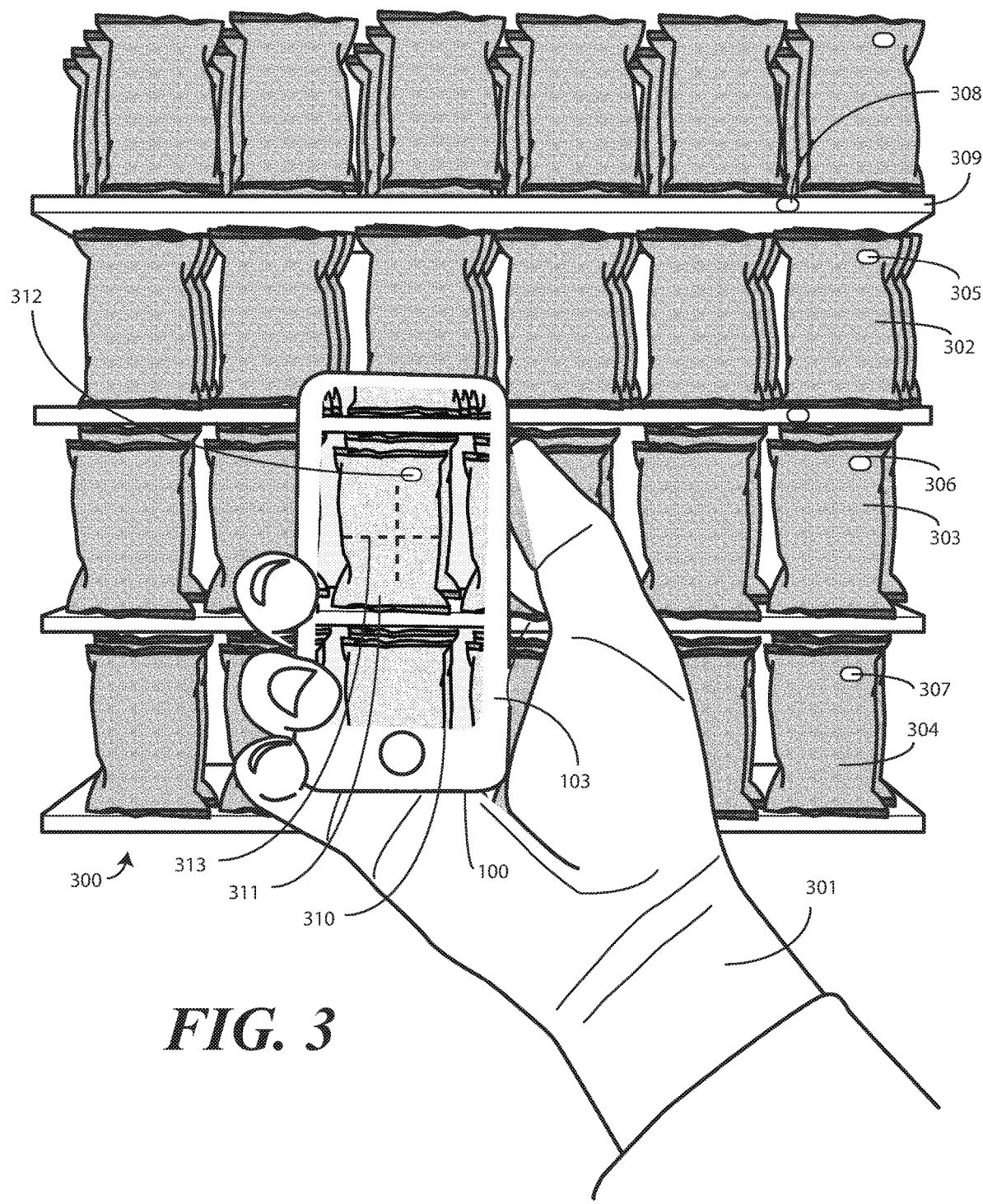
FIG. 3 illustrates one or more method steps of an electronic device in accordance with one or more embodiments of the disclosure.

Now that various embodiments of hardware and system components have been described, attention will be turned to methods in accordance with one or more embodiments of the disclosure. Turning now to FIG. 3, a user 301 is holding the electronic device 100 in front of a display 300 of items 302,303,304. In this illustration, the items 302,303,304 are bags of potato chips disposed along a series of shelves. While bags of potato chips are used for ease of discussion, it should be noted that the items 302,303,304 can take any of a variety of forms. The items 302,303,304 can, for example, be boxes of product, packages of product, or containers of product in other embodiments. In still other embodiments, the items 302,303,304 can be signs, marketing materials, or other objects. In general, the items 302, 303,304 can be any item that may have identifying markings, labeling, or printing disposed thereon.

In this illustrative embodiment, each of the items 302, 303,304 is blank and includes no markings, labeling, or printing. However, each of the items 302,303,304 has attached thereto an RFID tag 305,306,307. While RFID tags 305,306,307 are shown attached to the bags of chips in this example, they can be disposed elsewhere in other embodiments. For example, an RFID tag 308 identifying the bags of chips could be attached to one of the shelves 309, or to a nearby display or other object.

As shown, the user is using the intelligent imager (201) to capture one or more images 310, which may be static or video, of a particular item 311. From these one or more images 310, in one embodiment the one or more processors (104) of the electronic device 100 are able to identify the particular item 311. In particular, the one or more processors (104) identify the fact that the particular item 311 is of interest to the user 301. This can occur in a variety of ways.

Recall from above that in one or more embodiments, the intelligent imager (201) can optionally determine whether the object matches predetermined criteria. For example, the intelligent imager (201) operate as an identification module configured with optical recognition such as include image recognition, character recognition, visual recognition, facial recognition, color recognition, shape recognition and the like. Accordingly, the intelligent imager (201) can, in one or more embodiments, identify the particular item 311 by image analysis.

In another embodiment, the user 301 can assist the one or more processors (104) in identifying the particular item 311 by delivering user input to the electronic device 100. For example, the user 301 may deliver touch input to the display 103 to select the particular item 311 from the one or more images 310 so that it can be identified as an item of interest.

In yet another embodiment, optional indicia 313 can be presented on the display 103 such that the user 301 can align the indicia with the particular item 311 to alert the one or more processors (104) that the particular item 311 is an item of interest. Still other techniques for the one or more processors (104) to identify the particular item 311 as an item of interest will be obvious to those of ordinary skill in the art having the benefit of this disclosure.

The particular item 311 also has an RFID tag 312 attached thereto. When the one or more processors (104) of the electronic device identify the particular item 311 as an item of interest, in one or more embodiments the tag reader (107) then reads item information from the RFID tag 312, which is associated with the particular item 311. It is from this item information that one or more overlays can be retrieved to serve as "virtual" product labeling or packaging.

Figure 4:
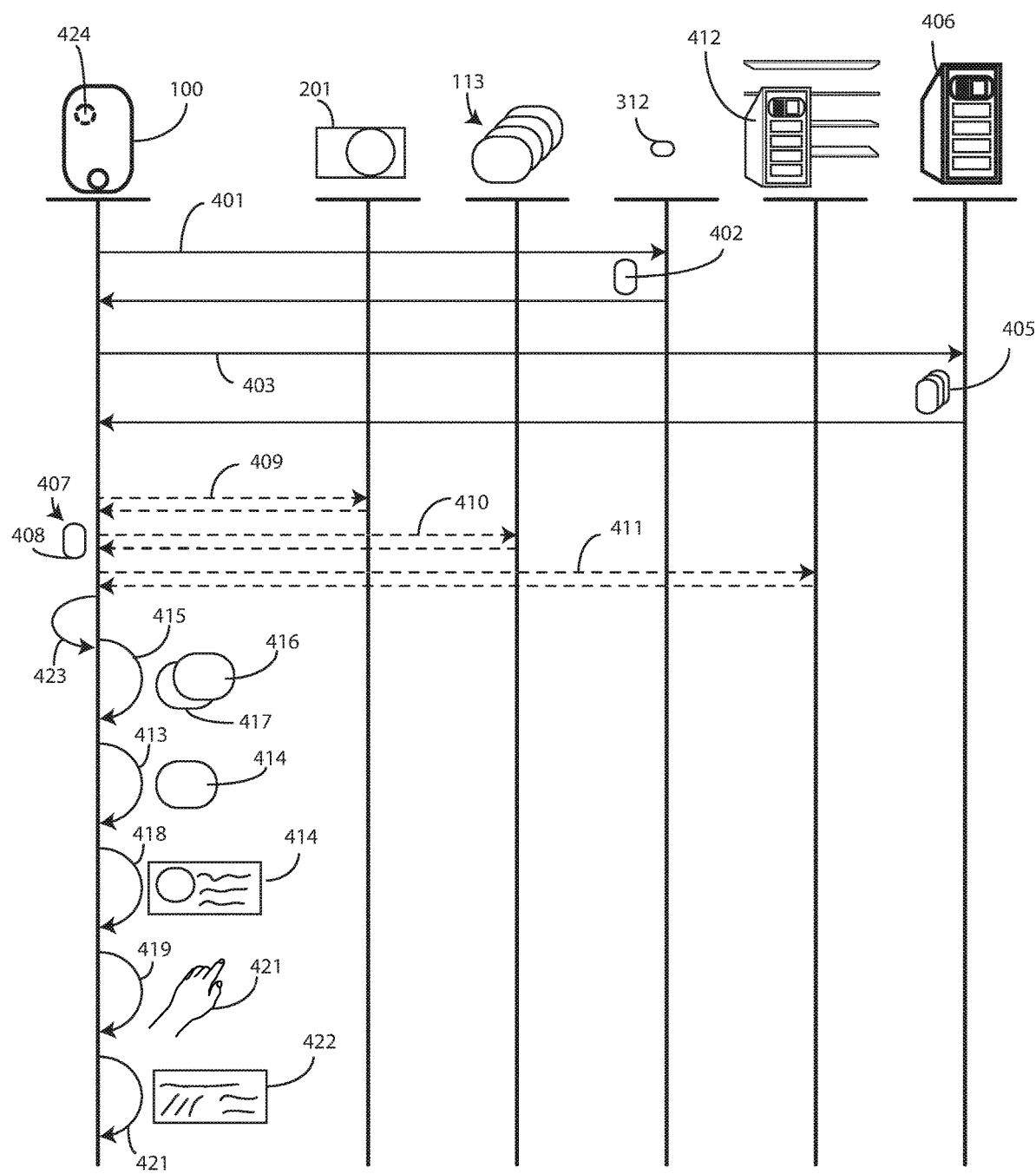
FIG. 4 illustrates a signal flow diagram of one explanatory method in accordance with one or more embodiments of the disclosure.

Turning now to FIG. 4, illustrated therein is a signal flow diagram showing how this can occur. In one or more embodiments, the tag reader (107) of the electronic device 100 reads 401 the RFID tag 312 to obtain 403 item information 402 from the RFID tag 312.

The electronic device 100, using its wireless communication device (106), then retrieves 404 one or more overlays 405 corresponding to the item information 402 retrieved from the RFID tag 312. In one or more embodiments, the one or more overlays 405 comprise a label for a product, such as a packaging label for the particular item (311) identified by the electronic device 100. Illustrating by example, the wireless communication device (106) may access a server 406, computer, or other electronic device at the manufacturer of the particular item (311) across a network. The wireless communication device (106) may access the "cloud" to retrieve the one or more overlays 405 from the manufacturer of the particular item (311).

In one or more embodiments, the one or more processors (104) of the electronic device 100 then optionally determine 407, with one or more sensors 113, a distance 408 of the electronic device 100 from the particular item (311). Knowledge of the distance 408 between the electronic device 100 and the particular item (311) is advantageous in that it can allow the one or more overlays 405 to be resized 423 so as to more realistically resemble product packaging, markings, or indicia when superimposed on the particular item (311). For example, when the one or more processors determine a distance 408 of the electronic device 100 from the particular item (311), in one or more embodiments they can resize one or both of the overlay or the image of the item as a function of the distance 408. This distance determination can occur in a variety of ways.

In one embodiment, image analysis 409 can occur using the intelligent imager 201 to determine the distance 408 between the electronic device 100 and the particular item (311). Recall from above that in one or more embodiments the intelligent imager 201 can compare the size of certain objects within captured images to other known objects to determine the size of the former. Illustrating by example, the intelligent imager 201 may identify a person standing near the particular item (311). By identifying the person, and presuming the person is of average height, e.g., five feet eleven inches tall, the intelligent imager 201 can approximate the size of the particular item (311) by comparing its size to the size of the person in the image. Alternatively, if the intelligent imager 201 identifies a floor and ceiling in the image (310) of the particular item (311), it may assume an average ceiling height of eight feet to determine the size of the particular item (311) in comparison. Other techniques for using image analysis 409 to determine the relative size of the particular item (311) will be obvious to those of ordinary skill in the art having the benefit of this disclosure.

In another embodiment, the one or more processors (104) of the electronic device can use the one or more sensors 113 and sensor signal analysis 410 to determine the distance 408 between the electronic device 100 and the particular item (311). For example, in one embodiment the proximity detector components (203) can detect the distance 408 between the electronic device 100 and the particular item (311) through transmitted and reflected infrared signals. In another embodiment, the one or more sensors 113 can perform received signal strength analysis on signals received by the tag reader (107) to determine the distance 408 between the electronic device 100 and the particular item (311). In still another embodiment, the one or more sensors 113 can perform simultaneous localization and mapping (SLAM) operations to create a map of the surroundings about the electronic device 100 to determine the distance 408 between the electronic device 100 and the particular item (311). Other techniques of preforming sensor signal analysis 410 to determine the distance 408 between the electronic device 100 and the particular item (311) will be obvious to those of ordinary skill in the art having the benefit of this disclosure.

In still another embodiment, the distance 408 between the electronic device 100 and the particular item (311) can be determined by communicating 411 with systems 412 collocated with the particular item (311). For example, if the display (300) of bags of chips is within a store, the wireless communication device (106) of the electronic device may communicate 411 with a server or other system 412 within the store to determine its location and the location of the particular item (311) within the store to determine the distance 408 between the electronic device 100 and the particular item (311).

In still other embodiments, location sensors 424 stored within the electronic device 100 could be used to determine the location of the electronic device, while location information for the particular item (311) could be retrieved from systems 412 collocated with the particular item (311) or from information from the RFID tag (312) itself. For example, the location sensors 424 of the electronic device may include a global positioning system device for determining where the electronic device 100 is located. The global positioning system device can communicate with a constellation of earth orbiting satellites or a network of terrestrial base stations to determine an approximate location. Examples of satellite positioning systems suitable for use with embodiments of the present invention include, among others, the Navigation System with Time and Range (NAVSTAR) Global Positioning Systems (GPS) in the United States of America, the Global Orbiting Navigation System (GLONASS) in Russia, and other similar satellite positioning systems. From this location information, and the location information of the particular item (311) obtained from systems 412 collocated with the particular item (311) or from information from the RFID tag (312) itself, the distance 408 between the electronic device 100 and the particular item (311) can be determined. Other techniques for determining the distance 408 between the electronic device 100 and the particular item (311) will be obvious to those of ordinary skill in the art having the benefit of this disclosure.

Since the one or more overlays 405 can include a plurality of overlays, in one or more embodiments it is necessary to select 413 an overlay 414 for initial presentation to the user. This can be accomplished in a variety of ways.

In one or more embodiments, the manufacturer will identify which overlay 414 from the plurality of overlays should be presented first. For example, the manufacturer may want a branded overlay to be presented before warranty information, and so forth. Accordingly, the manufacturer may preselect the overlay 414 for initial presentation.

However, in other embodiments the selection 413 can occur locally. For example, one or more processors (104) of the electronic device 100 may identify 415 one or more user behaviors 416 stored within a memory (105) of the electronic device. If, for example, the user behaviors 416 identify that the user is a sports fan, a sports-themed overlay may be selected 413 for initial presentation. By contrast, if the user is a new parent, a family themed overlay may be selected 413 for initial presentation. Similarly, if the one or more user behaviors 416 indicate that the user just purchased a bottle of Pinot Noir, a photograph of the product alongside a glass of wine may be selected 413 for initial presentation. Accordingly, in one or more embodiments the selection 413 of the overlay 414 occurs as a function of the one or more user behaviors 416.

In another embodiment, the one or more processors (104) may also identify 415 one or more user preferences 417 stored within a memory (105) of the electronic device 100. The selection 413 of the overlay 414 from the plurality of overlays can then occur as a function of the one or more user preferences 417. If, for example, the user has saved a user preference requesting to be informed when items go on sale, an overlay configured as a coupon may be selected 413 for initial presentation. If the user has saved a user preference requesting dietary information to be presented first, the selection 413 of the overlay 414 from the plurality of overlays may include selecting one with that includes such nutritional information, and so forth.

Once the optional selection 413 is made, the one or more processors (104) then present 418 the overlay 414 on the display (103) of the electronic device 100. As noted above, in one or more embodiments the presenting 418 can comprise resizing 423 the overlay 414 as a function of the distance of the electronic device 100 from the particular item (311). In one or more embodiments, this presentation 418 includes also presenting the image of the particular item (311) on the display (103) of the electronic device 100, where the presentation 418 of the overlay overlaps the image of the particular item (311) on the display (103).

In one or more embodiments where the one or more overlays 405 comprise a plurality of overlays, the user can control and/or select which overlay is being presented. For example, in one embodiment, the electronic device 100 receives 419 user input 420. The user may touch the display (103), make a gesture, swipe the display (103), or otherwise deliver user input 420 indicating that the overlay 414 should be changed. When this user input 420 is received, in one or more embodiments the one or more processors (104) of the electronic device 100 then replace 421 the overlay 414 with another overlay 422 selected from the plurality of overlays.

Figure 5:
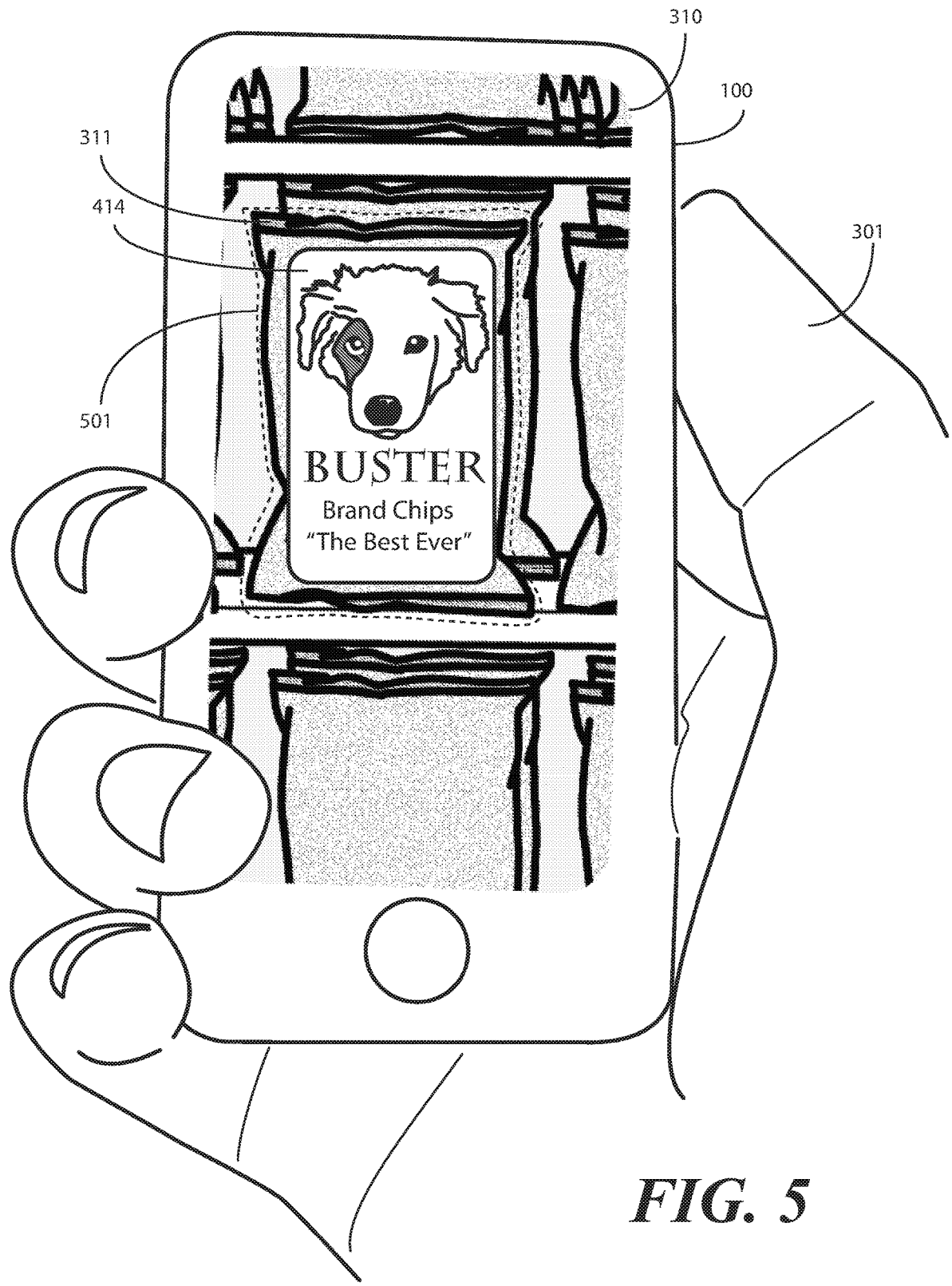
FIG. 5 illustrates one or more method steps of an electronic device in accordance with one or more embodiments of the disclosure.

Turning now to FIG. 5, illustrated therein is the electronic device 100 and user 301 from FIG. 3 after the method steps of FIG. 4 have been executed. As before, the user 301 is holding the electronic device 100, and is using the intelligent imager (201) to capture one or more images 310 of the particular item 311. From these one or more images 310, in one embodiment the one or more processors (104) of the electronic device 100 are able to identify the particular item 311. In particular, the one or more processors (104) identify the fact that the particular item 311 is of interest to the user 301. The tag reader (107) has interrogated item information from the RFID tag (312), associated with the particular item 311, and the method steps described above with FIG. 4 have been executed to retrieve an overlay 414 for presentation on the display 103.

The overlay 414 in this illustration is a label for a product. Since the particular item 311 of interest is a bag of chips, the one or more processors (104) and/or the augmented reality engine (108) are presenting the overlay 414 as a label that is superimposed on the image 310 of the particular item 311. Specifically, the one or more processors (104) and/or the augmented reality engine (108) superimpose the overlay 414 by positioning the overlay 414 within a perimeter boundary 501 defined by the particular item 311 in the one or more images 310.

The label in this illustration is for Buster Brand Chips. In addition to the brand, a logo and slogan appear on the overlay 414. Since the overlay 414 is superimposed on the particular item 311 within the perimeter boundary 501, an augmented reality experience is visible to the user 301. In short, by viewing the particular item 311 on the display 103, it looks as if the formerly blank bag of chips has a label stating, "Buster Brand Chips—The Best Ever."

As noted above, in one or more embodiments the overlay 414 that is presented is one selected from a plurality of overlays (405). Additionally, in one or more embodiments the one or more processors (104) of the electronic device 100 receive user input (420) from the display 103 and present another overlay selected from the plurality of overlays (405) in response to the user input (420).

Figure 6:
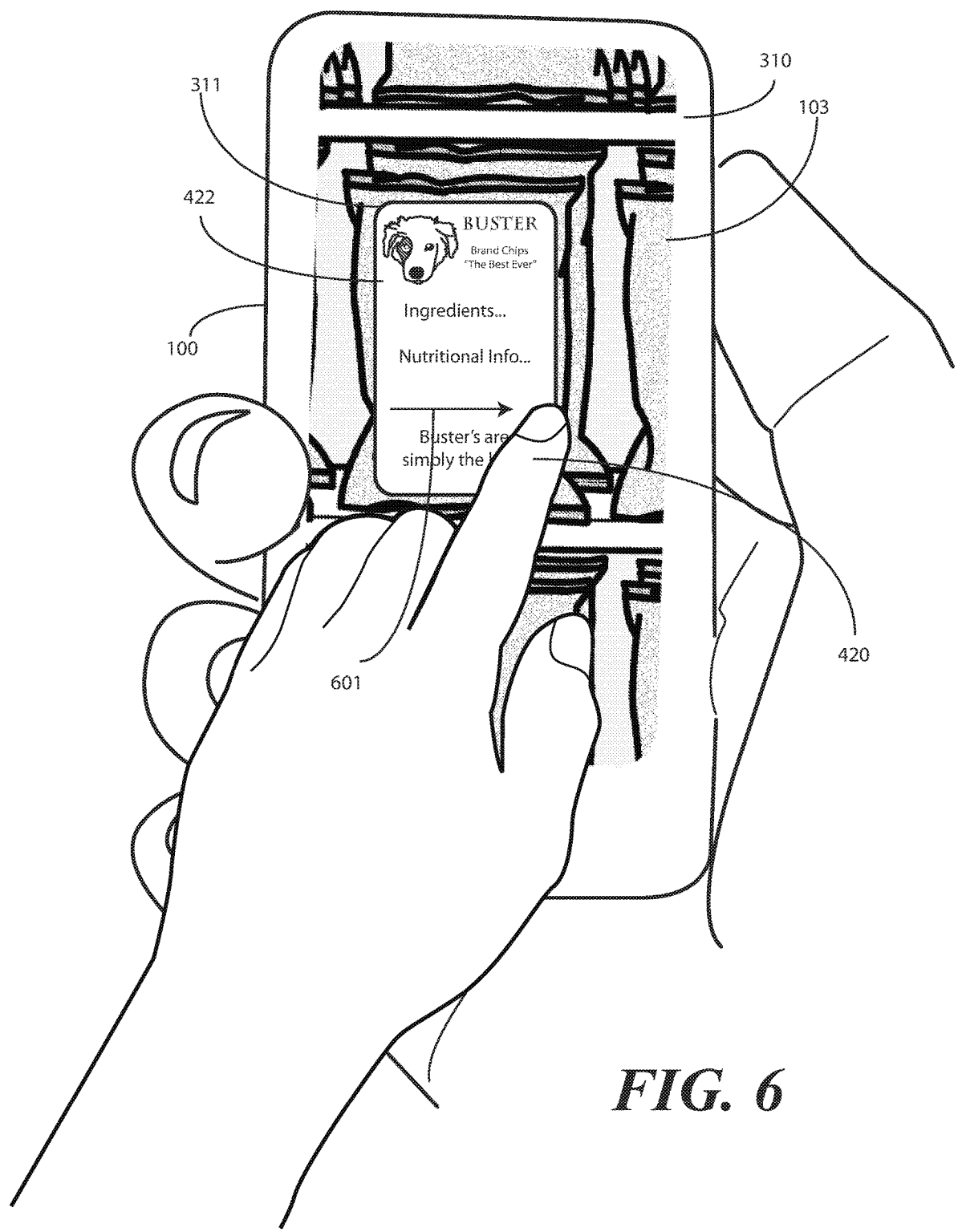
FIG. 6 illustrates one or more method steps of an electronic device in accordance with one or more embodiments of the disclosure.

Turning now to FIG. 6, illustrated therein is an example of this. As shown, the user 301 is delivering user input 420 to the display 103 of the electronic device 100 by making a swiping gesture 601. The swiping gesture 601 is only an example of user input, as touches, presses, twists, pinches, and other user input motions can be used in place of the swiping gesture 601. In one or more embodiments, in response to the user input 420, the one or more processors (104) of the electronic device 100 then present another overlay 422 on the display 103. In this illustration, the other overlay 422 is a nutritional label providing nutritional information. As with FIG. 5, the augmented reality engine (108) has at least partially superimposed the other overlay 422 on the image 310 of the particular item 311, thereby creating "virtual" package labeling that looks, at least on the display 103, to be product labeling.

Figure 7:
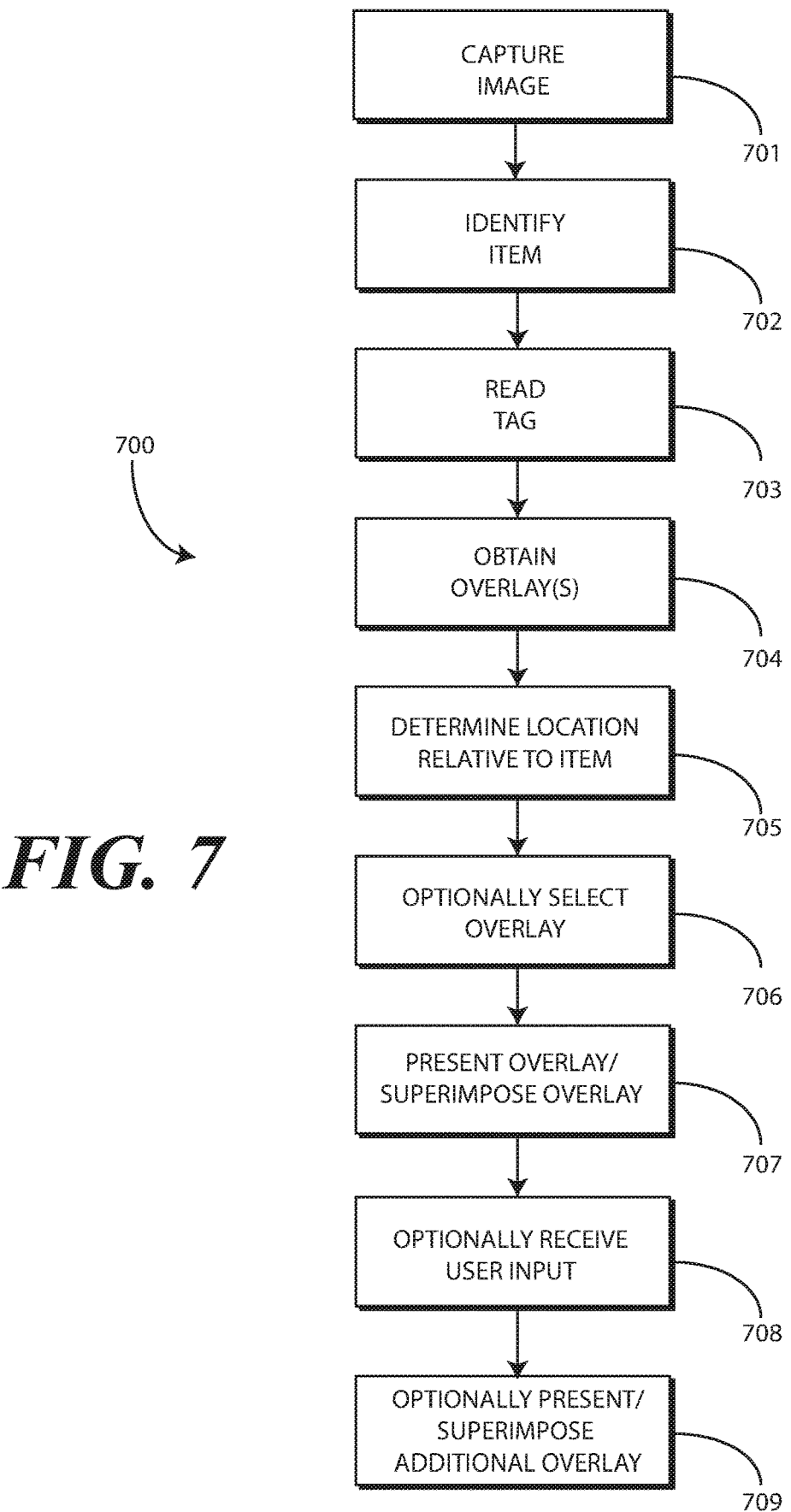
FIG. 7 illustrates one explanatory method in accordance with one or more embodiments of the disclosure.

Turning now to FIG. 7, illustrated therein is one explanatory method 700 for an electronic device in accordance with one or more embodiments of the disclosure. Beginning at step 701, the method 700 includes capturing, with an imager operable with one or more processors, one or more images of an item. In one or more embodiments, step 701 can also include presenting the image of the item on the display.

At step 702, the method 700 includes identifying, with one or more sensors of the electronic device, an item. In one or more embodiments, step 702 comprises determining that a particular item is an item of interest. As noted above, this can be accomplished in one embodiment by presenting alignment indicia on the display when capturing the image of the item at step 701. Alternatively, user input or other methods can be used to identify the item at step 702.

At step 703, the method includes reading, with a tag reader operable with the one or more processors, item information from a tag of the item. The tag can be an RFID tag, a BLUETOOTH.sup.™ tag, or other type of tag. Where the electronic device includes a beam steerer or directed beam tag reader, step 703 can include the beam steerer directing electronic signals from the tag reader. Where alignment indicia was presented at step 701, in one embodiment the beam steerer's direction can be aimed as a function of a location of the alignment indicia in the image of the item.

At step 704, the method 700 retrieves, with a wireless communication circuit, an overlay based upon the item information. In one embodiment, this is a single overlay. In another embodiment, this is one or more overlays. In another embodiment, this is a plurality of overlays.

At step 705, the method 700 includes determining, with one or more sensors operable with the one or more processors, a distance of the electronic device from the item. As noted above, this can occur in multiple ways.

Figure 8:
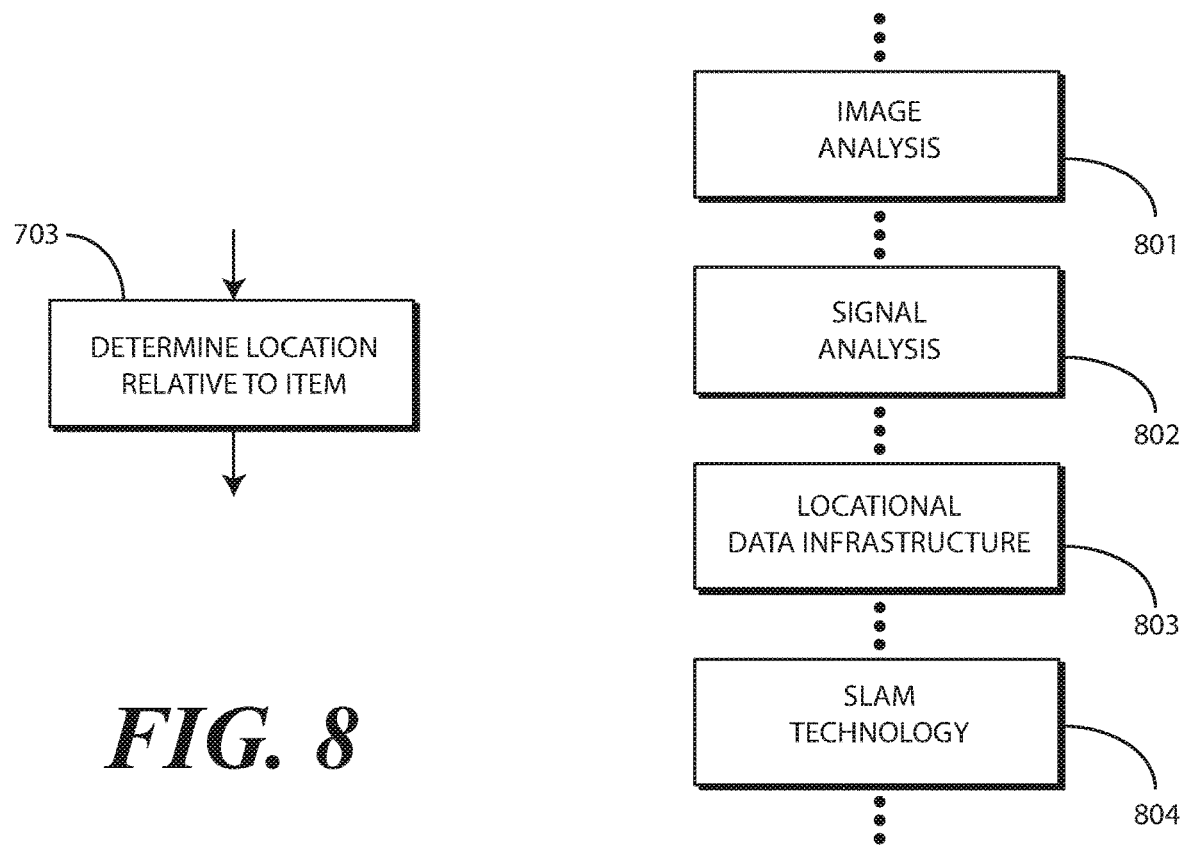
FIG. 8 illustrates one or more method steps in accordance with one or more embodiments of the disclosure.

Turning briefly to FIG. 8, illustrated therein are various ways in which step 705 can be determined. These can be used alone or in combination, and others will be obvious to those of ordinary skill in the art having the benefit of this disclosure.

In one embodiment, step 705 occurs by performing an image analysis 801 on the image captured at step (701). For example, one or more processors of the electronic device can determine a size of the item in the image presented on the display. Since product information read at step (703) has identified the product, the one or more processors can estimate the distance by comparing the scaled size of the item in the image presented on the display to the actual dimensions of the object. In other embodiments, the one or more processors can compare the scaled size to an identifiable object in the image, such as a person, a floor-to-ceiling dimension, or other object. Other image analysis techniques for determining the distance will be obvious to those of ordinary skill in the art having the benefit of this disclosure.

In another embodiment, signal analysis 802 can be performed to determine the distance. Since the tag reader interrogates the tag at step (703), the tag reader and/or one or more processors can analyze the return signal to determine deviations from the transmitted signal to estimate distance. A received signal strength indicator or other measurement device may measure received power compared to transmitted power at a given location and time to estimate the distance.

In another embodiment, the electronic device can access locational data 803 from the infrastructure of the environment to determine distance. If, for example, the electronic device is in a store, sensors within the store may communicate both the item location and the electronic device location to the electronic device for distance determination. Alternatively, sensors within the store may communicate the item location, while geolocators or geolocational sensors in the electronic device determine the device location. From these observations, a distance can be estimated.

In yet another embodiment, SLAM technology 804 can be used to determine the distance. SLAM technology, known in the art, is a method employing a series of computations and/or algorithms analyzing data from one or more sensors of the electronic device to construct a map of the electronic device's environment. SLAM technology allows the electronic device to determined where it is located at the same time that it maps its environment. SLAM Technology 804 first creates an estimated map the environment and then refines this may by orienting itself relative to objects within the environment.

Turning now back to FIG. 7, once the optional distance determination is made at step 705, in one or more embodiments step 705 can further include resizing the overlay as a function of the distance of the electronic device from the item. This allows the overlay to be "right sized" to more closely resemble a product label or packaging markings when presented on the display.

Figure 9:
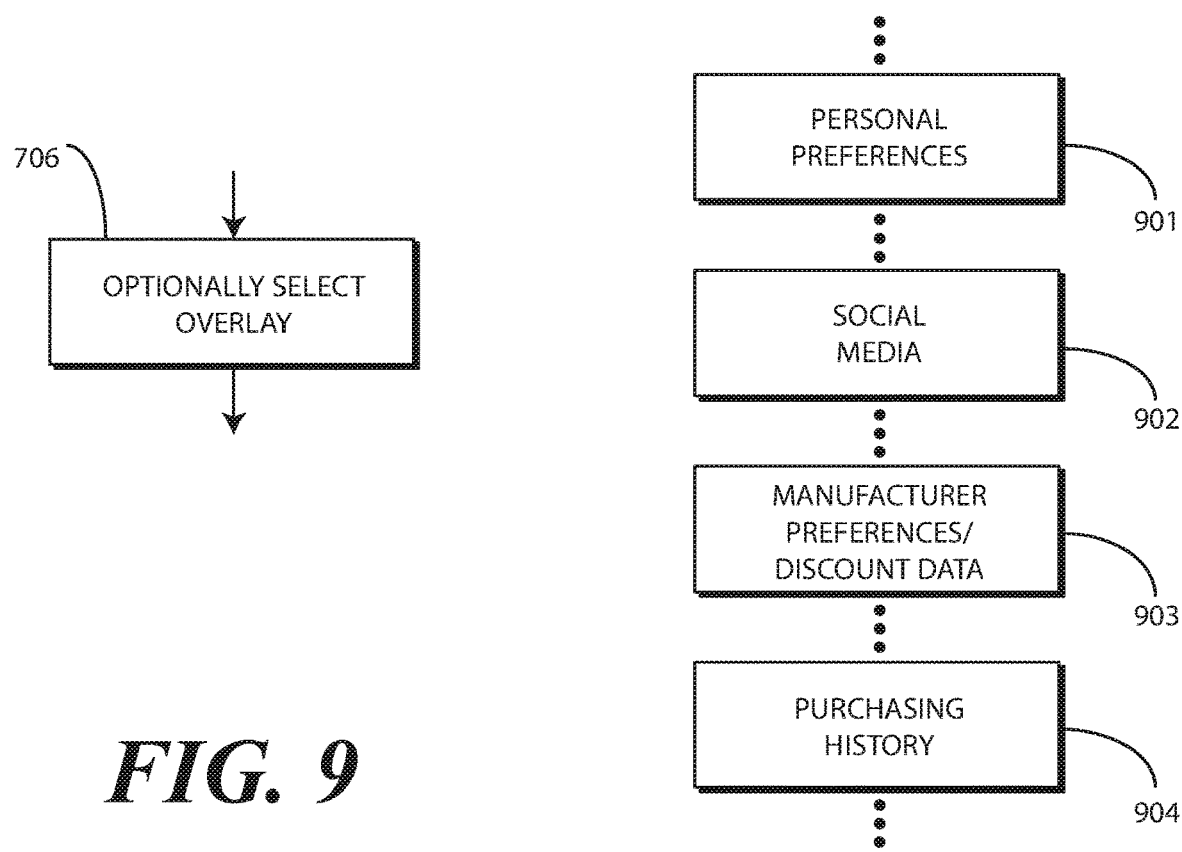
FIG. 9 illustrates one or more method steps in accordance with one or more embodiments of the disclosure.

The method 700 can optionally select one overlay from a plurality of overlays retrieved at step 706 for presentation to a user. Turning briefly to FIG. 9, illustrated therein are various factors upon which the selection at step 706 can be made.

In one or more embodiments, the selection of step 706 can be made as a function of user preferences 901. In one or more embodiments, step 706 comprises identifying one or more user preferences 901 stored within a memory of the electronic device, wherein the selecting the overlay from the plurality of overlays is a function of the one or more user preferences. If, for example, a person is a Chicago Bears fan, step 706 may comprise selecting an overlay with a Bears player pictured on it. By contrast, if the person is an opera fan, step 706 can comprise selecting an overlay with a picture of a violin, and so forth. Retrieving personal information from social media 902 can work the same way.

In another embodiment, manufacturer data 903 can be used to select the overlay. For example, if a product is on sale the overlay selected may be a coupon for the product. By contrast, if the product was recently rebranded, an overlay illustrating a new logo may be selected. If the product is in the southeast, and it is summer, an overlay showing the product being used poolside may be selected, and so forth.

In another embodiment, purchasing history 904 can be used to select the logo. Purchasing history 904 is an example of a user behavior. In one or more embodiments, step 706 comprises identifying one or more user behaviors stored within a memory of the electronic device, and selecting the overlay from the plurality of overlays is a function of the one or more user behaviors. If, for example, the purchasing history 904 shows that the user has purchased complementary items before, a particular overlay showing how the identified product works well with those complementary items may be shown. If the complementary items were PING.sup.™ golf irons, the overlay may show the golf club identified in a bag with a set of PING.sup.™ irons, and so forth.

Turning now back to FIG. 7, once the optional selection is made at step 706, in one or more embodiments step 707 comprises presenting, with the one or more processors, an overlay selected from the one or more overlays on a display of the electronic device. In one or more embodiments, the presentation of the overlay overlaps the image of the item on the display. For example, the presentation of step 707 can include superimposing, on a display with the one or more processors, the overlay on the one or more images of the item. This superposition can comprise positioning the overlay within a perimeter boundary defined by the item in the one or more images.

At step 708, the method 700 optionally receives user input. At step 709, the method 700 optionally includes changing the overlay from a first overlay to a second overlay. Thus, where step 708 comprises receiving, with a user interface operable with the one or more processors, user input, step 709 can comprise replacing, with the one or more processors, the overlay with another overlay selected from the plurality of overlays. This process can repeat until the number of overlays retrieved at step 704 is exhausted.

Figure 10:
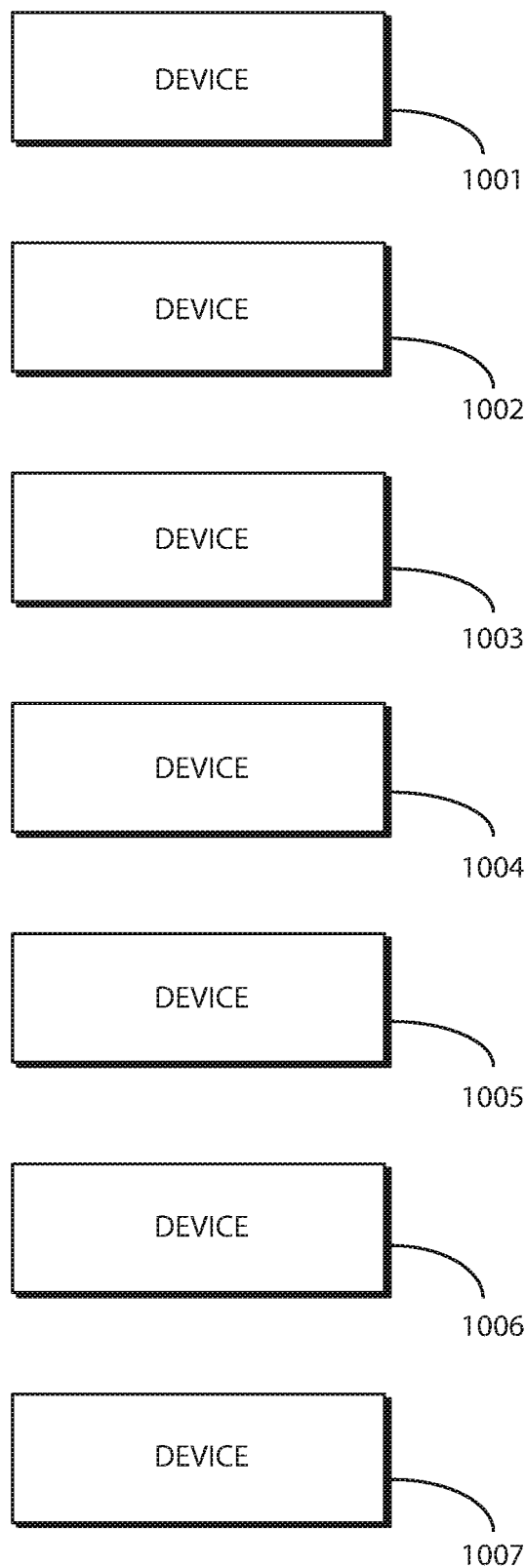
FIG. 10 illustrates one or more embodiments of the disclosure.

Turning now to FIG. 10, illustrated therein are various embodiments of the disclosure. At 1001, an electronic device includes one or more processors, a tag reader operable with the one or more processors, a display operable with the one or more processors, and a wireless communication circuit operable with the one or more processors. At 1001, the one or more processors identify an item in an environment of the electronic device from an image captured of the item. At 1001, the tag reader reads item information from a tag corresponding to the item. At 1001, the wireless communication circuit retrieves one or more overlays from the item information. At 1001 the one or more processors present an overlay selected from the one or more overlays on the display.

At 1002, the electronic device of 1001 also includes an imager operable with the one or more processors. At 1002, the imager captures an image of the item. At 1002, the one or more processors present the overlay by superimposing the overlay on the image of the item.

At 1003, the one or more processors of 1002 further present alignment indicia on the display when capturing the image of the item. At 1004, the electronic device of 1003 comprises a beam steerer operable with the tag reader. At 1004, the beam steerer directs electronic signals from the tag reader as a function of a location of the alignment indicia in the image of the item.

At 1005, the electronic device of 1001 further comprises one or more sensors operable with the one or more processors. At 1005, the one or more processors determine a distance of the electronic device from the item and resize one or both of the overlay or the image of the item as a function of the distance.

At 1006, the one or more overlays of 1001 comprise a plurality of overlays. At 1006, the one or more processors receive user input from the display and present another overlay selected from the plurality of overlays in response to the user input. At 1007, the one or more overlays of 1001 comprise a plurality of overlays. At 1007 the one or more processors select the overlay from the plurality of overlays as a function of one of one or more user preferences.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure.

What is claimed is:

1. A method in an electronic device, the method comprising:
   identifying, with one or more processors of the electronic device, an item;
   reading, with a tag reader operable with the one or more processors, item information from a tag associated with the item;
   retrieving, with a wireless communication device operable with the one or more processors, a plurality of overlays corresponding to the item information;
   selecting, with the one or more processors, an overlay from the plurality of overlays; and
   presenting, with the one or more processors, the overlay selected from the one or more overlays on a display of the electronic device.

2. The method of claim 1, further comprising capturing, with an imager operable with the one or more processors, an image of the item.

3. The method of claim 2, further comprising also presenting the image of the item on the display, wherein a presentation of the overlay overlaps the image of the item on the display.

4. The method of claim 1, further comprising:
   receiving, with a user interface operable with the one or more processors, user input; and
   replacing, with the one or more processors, the overlay with another overlay selected from the plurality of overlays.

5. The method of claim 1, wherein the item comprises a package, the overlay defining a virtual label for the package.

6. The method of claim 1, further comprising identifying one or more user behaviors stored within a memory of the electronic device, wherein the selecting the overlay from the plurality of overlays is a function of the one or more user behaviors.

7. The method of claim 1, further comprising identifying one or more user preferences stored within a memory of the electronic device, wherein the selecting the overlay from the plurality of overlays is a function of the one or more user preferences.

8. The method of claim 1, further comprising determining, with one or more sensors operable with the one or more processors, a distance of the electronic device from the item.

9. The method of claim 8, wherein the presenting comprises resizing the overlay as a function of the distance of the electronic device from the item.

10. The method of claim 1, wherein the overlay comprises a label for a product.

11. An electronic device, comprising:
one or more processors;
a tag reader operable with the one or more processors;
a display operable with the one or more processors; and
a wireless communication circuit operable with the one or more processors;
   the one or more processors identifying an item in an environment of the electronic device;
   the tag reader reading item information from a tag corresponding to the item;
   the wireless communication circuit retrieving one or more overlays from the item information; and
   the one or more processors presenting an overlay selected from the one or more overlays on the display by superimposing the overlay on the image of the item, the item comprising a blank package without labeling, the overlay defining a package label for the blank package.

12. The electronic device of claim 11, further comprising an imager operable with the one or more processors, the imager capturing an image of the item, the one or more processors determining the item is an item of interest in response to a user aligning the alignment indicia.

13. The electronic device of claim 12, the one or more processors further presenting the alignment indicia on the display when capturing the image of the item.

14. The electronic device of claim 13, further comprising a beam steerer operable with the tag reader, the beam steerer directing electronic signals from the tag reader as a function of a location of the alignment indicia in the image of the item.

15. The electronic device of claim 12, further comprising one or more sensors operable with the one or more processors, the one or more processors determining a distance of the electronic device from the item and resizing one or both of the overlay or the image of the item as a function of the distance.

16. The electronic device of claim 11, the one or more overlays comprising a plurality of overlays, the one or more processors receiving user input from the display and presenting another overlay selected from the plurality of overlays in response to the user input.

17. The electronic device of claim 11, the one or more overlays comprising a plurality of overlays, the one or more processors selecting the overlay from the plurality of overlays as a function of one of one or more user preferences.

18. A method in an electronic device, the method comprising:
   capturing, with an imager operable with one or more processors, one or more images of an item;
   reading, with a tag reader operable with the one or more processors, item information from a tag of the item;
   retrieving, with a wireless communication circuit, an overlay based upon the item information; and
   superimposing, on a display with the one or more processors, the overlay on the one or more images of the item, wherein the superimposing comprises positioning the overlay within a perimeter boundary defined by the item in the one or more images.

19. The method of claim 18, wherein the item in the one or more images comprises a blank package, wherein the positioning the overlay within the perimeter boundary defined by the item in the one or more images creates a labeled package appearance on the display.

20. The method of claim 18, further comprising changing the overlay from a first overlay to a second overlay.

* * * * *